(12) United States Patent
Tamai et al.

(10) Patent No.: US 7,034,988 B2
(45) Date of Patent: Apr. 25, 2006

(54) WAVELENGTH CONVERSION DEVICE

(75) Inventors: Hideaki Tamai, Tokyo (JP); Saeko Oshiba, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 197 days.

(21) Appl. No.: 10/767,266

(22) Filed: Jan. 30, 2004

(65) Prior Publication Data

US 2004/0184139 A1 Sep. 23, 2004

(30) Foreign Application Priority Data

Feb. 26, 2003 (JP) .............................. 2003-049999

(51) Int. Cl.
*G02F 2/02* (2006.01)
*G02B 6/34* (2006.01)

(52) U.S. Cl. .................................... 359/326; 385/37
(58) Field of Classification Search ................ 359/326, 359/328, 332; 385/15, 37
See application file for complete search history.

(56) References Cited

U.S. PATENT DOCUMENTS

| | | | | |
|---|---|---|---|---|
| 5,960,146 | A * | 9/1999 | Okuno et al. | 385/122 |
| 6,724,783 | B1 * | 4/2004 | Jalali et al. | 372/9 |
| 6,853,774 | B1 * | 2/2005 | Watanabe | 385/39 |
| 2003/0128414 | A1 * | 7/2003 | Watanabe et al. | 359/237 |

FOREIGN PATENT DOCUMENTS

JP 2000-066253 3/2000
JP 2001-251253 9/2001

* cited by examiner

*Primary Examiner*—John D. Lee
(74) *Attorney, Agent, or Firm*—Venable; James R. Burdett (57) ABSTRACT

A feature of a wavelength conversion device of this invention is the board range of selection of wavelengths which can be obtained by conversion. A wavelength conversion device of this invention comprises an SC light generation portion 12, which receives an excitation light pulse output from an excitation light pulse source and generates SC light, and an optical wavelength filter 14 which filters the SC light. An excitation light pulse source generates an excitation light pulse, of central wavelength $\lambda_S$. When the excitation light pulse generated by the excitation light pulse source is incident on the SC medium, SC light having a flat spectral shape over the range from wavelength $\lambda_L$ to wavelength $\lambda_H$ (where $\lambda_L < \lambda_H$) is generated. The optical wavelength filter has a characteristic such that the filtering transmitted central wavelengths are $\lambda_1, \lambda_2, \lambda_3, \ldots, \lambda_n$ (where n is a natural number). A further feature is that the following conditions (1) and (2-1), (2-2), ..., (2-n) between the wavelength $\lambda_L$, the wavelength $\lambda_H$, the wavelength $\lambda_S$, and the wavelengths $\lambda_1, \lambda_2, \lambda_3, \ldots, \lambda_n$ (where n is a natural number) are satisfied.

$$\lambda_L < \lambda_S < \lambda_H \quad (1)$$

$$\lambda_L < \lambda_1 < \lambda_H \quad (2\text{-}1)$$

.

.

.

$$\lambda_L < \lambda_n < \lambda_H \quad (2\text{-}n)$$

15 Claims, 10 Drawing Sheets

WAVELENGTH CONVERSION DEVICE

BACKGROUND OF THE INVENTION

1. Field of the Invention

This invention relates to a wavelength conversion device in which an excitation light pulse is made incident on a nonlinear optical medium as incident light, SC (supercontinuum) light is generated in the nonlinear optical medium, and by filtering this SC light using an optical band-pass filter, conversion into an optical pulse of wavelength different from that of the incident light is performed.

2. Description of Related Art

Various means are being studied in order to construct large-capacity optical communication networks with transmission rates of 1 Tbit/s and higher. Among these, the technology attracting the most attention is wavelength division multiplexing (WDM). In order to realize a WDM optical communication network, a wavelength conversion device is deemed necessary. For example, if a wavelength conversion device is adopted in an optical cross-connect node (OXCN), it becomes possible to avoid collision between channels and to reutilize wavelengths; in addition, improvements in network management and in the network itself (upgrades) are facilitated. As a result, there is the advantage that new communication bands can be utilized.

Due to such demands, the wavelength conversion devices described below were developed. In such wavelength conversion devices, the natural law utilized to effect wavelength conversion is, for example, four-wave mixing (FWM) occurring in a nonlinear optical medium, such as in a semiconductor optical amplifier or similar (see for example Japanese Patent Application Laid-open No. 2000-66253).

Further, there has also been an attempt to realize a WDM optical communication network using a multiple-wavelength light source, by selecting the light generated by the multiple-wavelength light source and by allocation to different channels (see for example Japanese Patent Application Laid-open No. 2001-251253).

However, a wavelength conversion device utilizing FWM occurring in the gain region of a semiconductor optical amplifier, taking the gain region of the semiconductor optical amplifier to be a nonlinear optical medium as disclosed in Japanese Patent Application Laid-open No. 2000-66253, has the following problem. That is, a lens must be used in order to optically connect the semiconductor optical amplifier to an optical fiber which is the communication path of an optical communication system, and a process of precise position adjustment is necessary in order to determine the positional relationship of the lens, the semiconductor optical amplifier, and the optical fiber. Difficulty is involved in the process of position adjustment to cause light emitted from the semiconductor optical amplifier to be incident on the optical fiber with low loss, and due to various elements such as the propagation mode of light propagating through the optical waveguide of the semiconductor optical amplifier, the condensing characteristics of the lens, and the numerical aperture of the optical fiber, there are limits beyond which the connection loss cannot be reduced further.

Also, the wavelength of light obtained through wavelength conversion is determined uniquely by the wavelength of the signal light and the wavelength of the pump light, so that there is the constraint that conversion into light of an arbitrary wavelength is not possible. This is also a major technical constraint imposed on construction of a WDM optical communication system.

In the wavelength conversion device using a multiple-wavelength light source disclosed in Japanese Patent Application Laid-open No. 2001-251253, it is necessary to incorporate a new multiple-wavelength light source device into the wavelength conversion device, and consequently power consumption is increased. Reduction of this power consumption is a technical problem. Also, because numerous devices and components are necessary, such as a clock signal generator, signal regenerator and control circuit, there is the problem that the wavelength conversion itself becomes complicated, and productivity worsens.

Moreover, devices such as a clock signal generator, signal regenerator and control circuit generally only operate at limited frequencies. Hence the bit rate of an optical communication system thus constructed is limited, and, for example, it is difficult to achieve higher bit rates.

Hence an object of this invention is to provide a wavelength conversion device with a broad range of selection of light wavelengths obtained through conversion.

SUMMARY OF THE INVENTION

In order to achieve the above object, a wavelength conversion device of this invention comprises an SC light generation portion, onto which excitation light pulses are incident and which generates SC light, and an optical wavelength filter which filters SC light.

SC light is pulsed light distributed over a wavelength band broader than the full width at half-maximum of an excitation light pulse. The mechanism of generation of SC light is summarized below.

When light having a narrow spectral band, that is, monochromatic light, is made incident on for example a dispersion-reducing optical fiber or other nonlinear optical medium, due to a self-phase modulation phenomenon within the nonlinear optical medium, the spectral width of the incident light is broadened. Incident light the spectral width of which has been thus broadened has its spectral bandwidth broadened coherently across the wavelength range overlapping the gain band of four-wave mixing. In this way, incident light having a narrow spectral band is converted into light having a broad spectral band. This converted light having a broad spectral band is SC light.

The excitation light pulse source generates excitation light pulses with a central wavelength of $\lambda_S$. When an excitation light pulse generated by the excitation light pulse source is incident, the SC medium functions as an SC light generation portion, generating SC light having a spectral shape distributed over the range from the wavelength $\lambda_L$ to the wavelength $\lambda_H$ (where $\lambda_L < \lambda_H$). The optical wavelength filter has characteristics for which the transmitted central wavelength is $\lambda_1, \lambda_2, \lambda_3, \ldots, \lambda_n$ (where n is a natural number).

The following conditions (1) and (2-1), (2-2), ..., (2-n) between the wavelength $\lambda_L$, the wavelength $\lambda_H$, the wavelength $\lambda_S$ and the wavelengths $\lambda_1, \lambda_2, \lambda_3, \ldots, \lambda_n$ (where n is a natural number) are satisfied.

$$\lambda_L < \lambda_S < \lambda_H \tag{1}$$

$$\lambda_L < \lambda_1 < \lambda_H \tag{2-1}$$

·

·

·

$$\lambda_L < \lambda_n < \lambda_H \tag{2-n}$$

By means of a wavelength conversion device of this invention as described above, an excitation light pulse with central wavelength $\lambda_S$ is wavelength-converted into a light pulse having a spectral band with wavelengths in the range from the wavelength $\lambda_L$ to the wavelength $\lambda_H$ (where $\lambda_L<\lambda_H$) as given by the condition equation (1). That is, if an optical wavelength filter is used in a range in which the transmission central wavelengths $\lambda_1, \lambda_2, \lambda_3, \ldots, \lambda_n$ satisfy the condition equations (2-1), (2-2), . . . , and (2-n), then it is possible to select, from the SC light existing throughout the range from the wavelength $\lambda_L$ to the wavelength $\lambda_H$, a light pulse of arbitrary wavelength within the broad range from the wavelength $\lambda_L$ to the wavelength $\lambda_H$.

To explain the case of n=1 in particular, if an excitation light pulse with central wavelength $\lambda_S$ is incident on a wavelength conversion device of this invention, the light pulse is wavelength-converted into a light pulse of central wavelength $\lambda_1$. Similarly, to explain the case of n=2, if an excitation light pulse with central wavelength $\lambda_S$ is incident on a wavelength conversion device of this invention, this means that a light pulse with a central wavelength of $\lambda_1$ and a light pulse with a central wavelength of $\lambda_2$ are obtained. Operation is similar for cases in which n is 3 or greater.

Further, as a SC medium which is a SC light generation portion, it is preferable that an optical fiber be used having a characteristic such that the absolute value of the wavelength dispersion at wavelength $\lambda_S$ decreases in the propagation direction. By means of such an optical fiber, SC light can be efficiently generated.

It is preferable that the shape of the transmission spectrum of the above-described optical wavelength filter have a transmission characteristic equivalent to the spectral shape obtained by a Fourier transform of the temporal waveform of light pulses the central wavelengths of which are $\lambda_1, \lambda_2, \lambda_3, \ldots, \lambda_n$ (where n is a natural number). Specifically, it is preferable that the above-described optical wavelength filter be an optical wavelength filter having a transmission characteristic expressed by a Gaussian function for the optical transmissivity, taking the wavelength as an independent variable. Subsequently, an optical wavelength filter having a transmission characteristic represented by such a Gaussian function shall be called a Gaussian optical wavelength filter.

If an optical wavelength filter having a transmission characteristic such as described above is used, output side lobes do not appear in the output temporal waveforms of light pulses filtered by this optical wavelength filter, and the problem of interference with temporally adjacent light pulses does not readily occur. The output waveform of a light pulse filtered by an optical wavelength filter is a light pulse waveform representing the optical intensity along the vertical axis and taking the horizontal axis to be the time axis. Hereafter, the waveform of a light pulse represented in this way shall be called a temporal waveform of the light pulse.

A Gaussian optical wavelength filter has the property that the transmission characteristic has a shape equivalent to the spectral shape obtained by Fourier transform of the temporal waveform of the light pulse. Hence output side lobes do not appear in the temporal waveform of a light pulse filtered by a Gaussian optical wavelength filter.

Further, it is preferable that the above-described optical wavelength filter be an optical wavelength filter the transmission bandwidth $\Delta f$ (Hz) of which satisfies the following condition (3).

$$\Delta f = f_h > 0.44 f_0 \quad (3)$$

Here, $f_h$ (Hz) is the full width at half-maximum on the frequency axis of light pulses with converted wavelengths $\lambda_1, \lambda_2, \lambda_3, \ldots, \lambda_n$ where n is a natural number), and $f_0$ (Hz) is a frequency determined by the minimum value ($1/f_0$, seconds) of the bit slot set such that interference with adjacent light pulses on the time axis does not occur.

By means of an optical wavelength filter satisfying the above-described condition (3), when light pulses emitted from the optical wavelength filter exist forming a train on the time axis, there is no interference between adjacent light pulses.

BRIEF DESCRIPTION OF THE DRAWINGS

The foregoing and other objects, features and advantageous of the present invention will be better understood from the following description taken in connection with the accompanying drawings, in which.

DESCRIPTION OF THE PREFERRED EMBODIMENTS

Below, embodiments of the invention are explained, referring to FIG. 1 through FIG. 10. The drawings show examples of configurations related to the invention, but the cross-sectional shapes, positional relationships and similar of the various constituent components are merely shown in a summary manner to an extent enabling understanding of the invention, and the invention is not limited to these examples. Further, in the following explanations specific materials, conditions and similar may be used, but these materials and conditions are no more than preferred examples, and so the invention is not limited thereto. In the drawings, similar constituent components are assigned the same numbers, and redundant explanations are omitted.

In the drawings shown below, the pathways of optical signals, such as optical fibers and similar, are represented by bold lines, and the pathways of electrical signals are represented by thin lines. Numbers and symbols assigned to these bold lines and thin lines signify the respective optical signals or electrical signals.

Basic Configuration of a Wavelength Conversion Device

Figure 1:
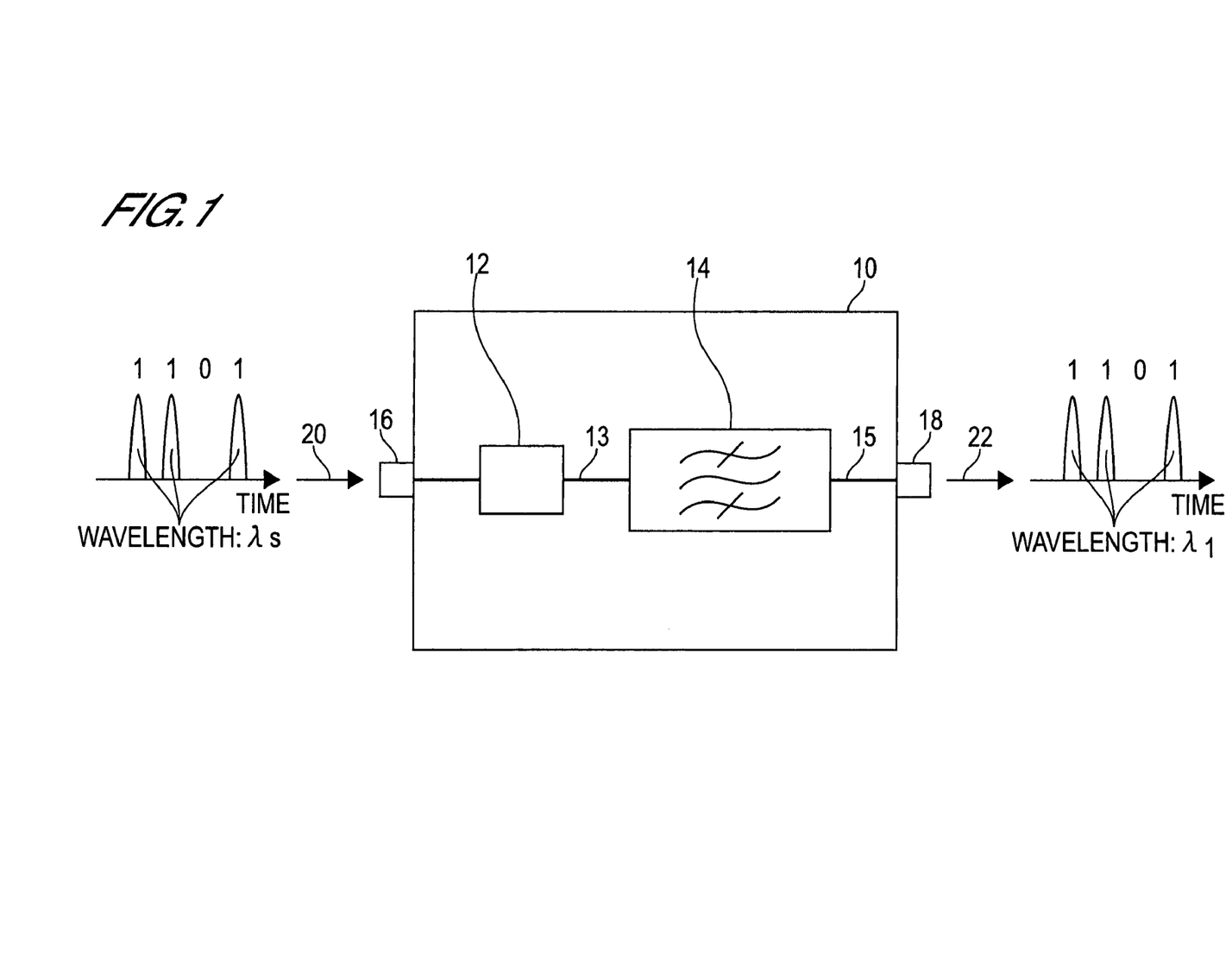
FIG. 1 shows the basic configuration of a wavelength conversion device of this invention.

The basic configuration of a wavelength conversion device of this invention is explained, referring to FIG. 1. The wavelength conversion device 10 comprises an SC light generation portion 12 and an optical wavelength filter 14. The light pulse train 20 drawn in diagrammatic fashion on the left side of FIG. 1 is an excitation light pulse train the wavelength of which is $\lambda_S$, and are unconverted light pulses which are incident on the wavelength conversion device 10 of this invention.

Positions at which light pulses exist on the time axis are distributed at equal intervals; for example, the light pulse train can be interpreted as representing "0"s at positions at which no light pulse exists, and "1" at positions at which light pulses exist. In other words, the example shown in FIG. 1 is a light pulse train representing the binary digital signal "1101". The time interval between peaks of adjacent light pulses is called a bit slot.

The incident light pulse train 20 is incident from the input terminal 16 on the SC light generation portion 12, and is converted into SC light 13 with wavelength distributed over the range from wavelength $\lambda_L$ to wavelength $\lambda_H$ (where $\lambda_S < \lambda_H$). The SC light 13 is filtered by the optical wavelength filter 14, to become the light pulse train 15 with wavelength $\lambda_1$. The light pulse train 15 becomes the emission light pulse train 22 via the output terminal 18, and is output to the exterior from the wavelength conversion device 10. The incident light pulse train 20 and emission light pulse train 22 are drawn in explanatory fashion on the left and right sides respectively of FIG. 1. The incident light pulse train 20 and the emission light pulse train 22 have the same shape on the time axis, but the wavelength is converted from $\lambda_S$ to $\lambda_1$.

The principle of the above-described wavelength conversion is explained in detail, referring to FIGS. 2A to 2D. The vertical axis in FIGS. 2A, 2B and 2D indicates light intensity, and the horizontal axis indicates wavelength, both with arbitrary scales. Further, the vertical and horizontal axes in FIG. 2C indicate transmissivity and wavelength respectively, also with arbitrary scales.

Figure 2A:
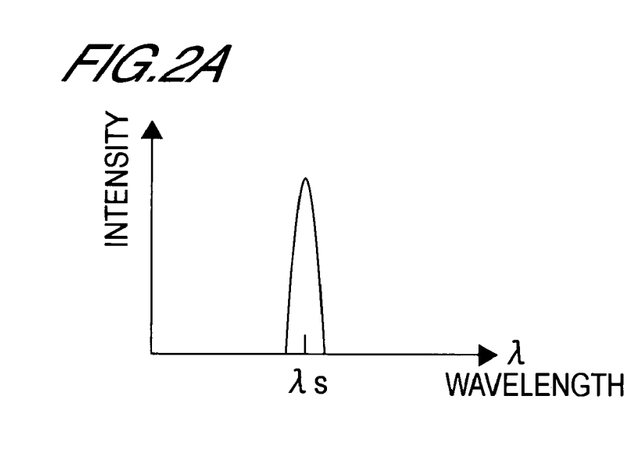
FIGS. 2A to 2D are drawings used to explain the spectral structure of light pulses and SC light.
Figure 2B:
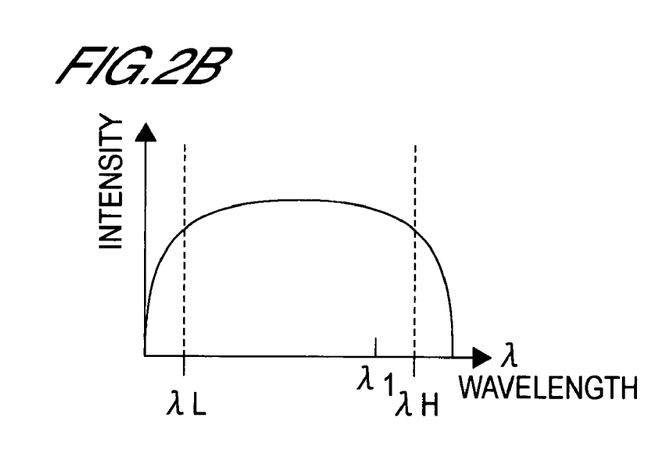
Figure 2C:
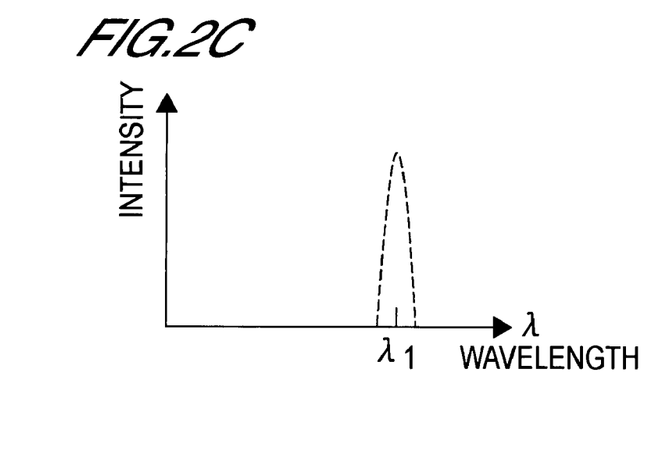
Figure 2D:
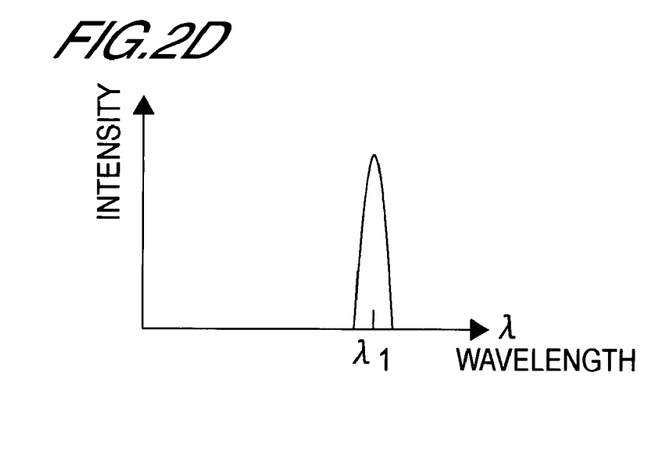

FIG. 2A shows the spectrum of a light pulse train 20 which is incident on the wavelength conversion device 10. The central wavelength of the light pulses is indicated to be $\lambda_S$. FIG. 2B shows the spectrum of SC light 13, emitted from the SC light emission portion 12, having a spectral shape in which the wavelength is distributed over the range from wavelength $\lambda_L$ to wavelength $\lambda_H$ (where $\lambda_L < \lambda_H$). FIG. 2C shows the transmissivity characteristic of the optical wavelength filter 14. FIG. 2D shows the spectrum of the light pulse train 22 emitted from the wavelength conversion device 10.

The incident light pulse train 20, having the spectrum with wavelength $\lambda_S$ as the central wavelength shown in FIG. 2A, is incident on the wavelength conversion device 10 from the input terminal 16. This incident light pulse train 20 is a light pulse train having a light pulse repetition frequency of $f_0$ (Hz). In optical communications, this light pulse train 20 is modulated as an RZ (return-to-zero) signal.

The incident light pulse train 20 is converted into SC light 13 having a spectrum shape in which the wavelength is distributed over the range from wavelength $\lambda_L$ to wavelength $\lambda_H$ (where $\lambda_L < \lambda_H$), shown in FIG. 2B. On the other hand, the optical wavelength filter 14 has a transmissivity characteristic in which the central wavelength is $\lambda_1$, as shown in FIG. 2C. Here, the case in which the central wavelength of the optical wavelength filter 14 is $\lambda_1$ is explained; but operation is similar when the central wavelength of the optical wavelength filter 14 is some wavelength other than $\lambda_1$, such as $\lambda_2$. In other words, the central wavelength $\lambda_1$ of the converted light pulses and the wavelength at which the transmissivity of the optical wavelength filter 14 is maximum (of which the central wavelength is $\lambda_1$) are made to coincide.

SC light 13 output from the SC light generation portion 12 is passed through the optical wavelength filter 14 to extract only the desired wavelength component, so that an emission light pulse train 22 (with wavelength $\lambda_1$) having a wavelength different from that of the incident light pulse train 20 (with wavelength $\lambda_S$) can be obtained, as shown in FIG. 2D. When the incident light pulse train 20 is modulated as an RZ signal, the light pulse train 22 obtained by wavelength conversion is also modulated as an RZ signal with the same shape. Wavelength conversion can be performed regardless of the bit rate of the incident light pulse train 20. And by using as the optical wavelength filter an optical wavelength filter the transmission wavelength of which is variable, as in the second embodiment described below, it is also possible to continuously vary with time the wavelength of the emission light pulse train 22 obtained through wavelength conversion.

First Embodiment

Figure 3:
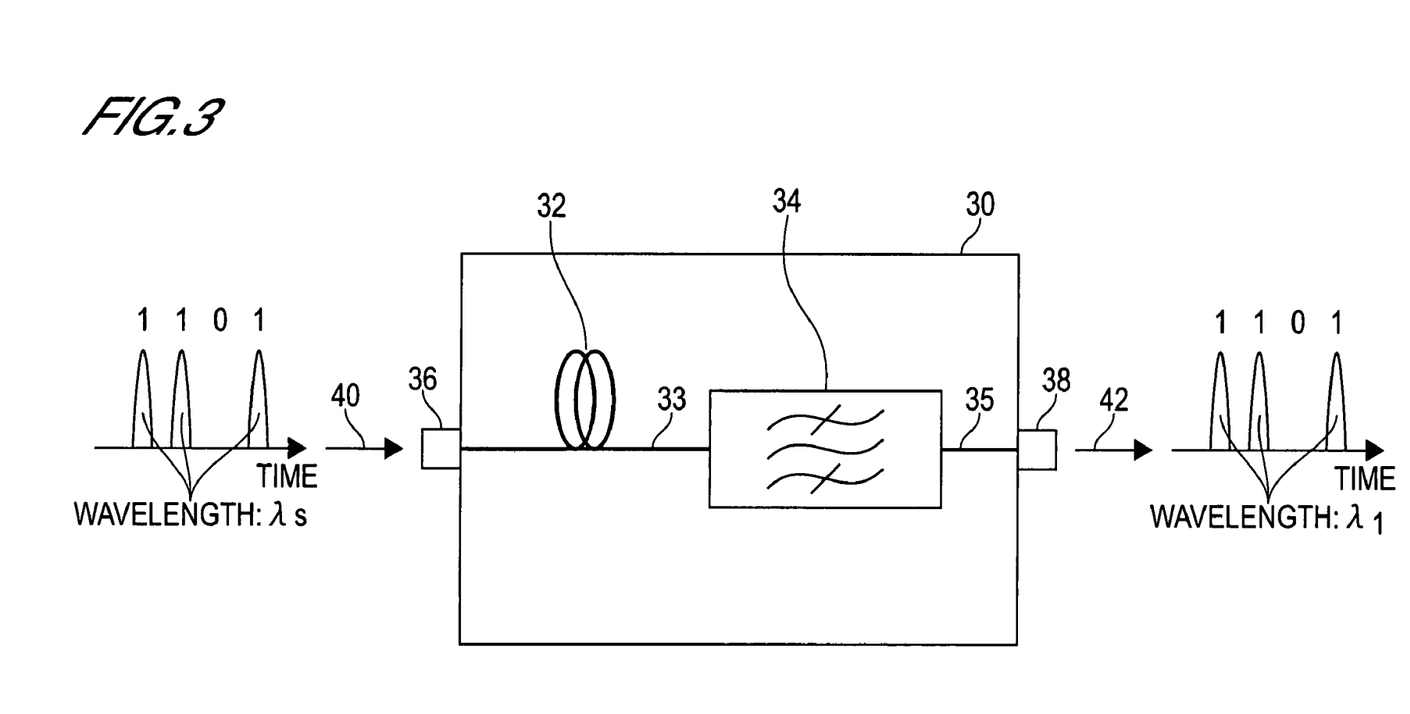
FIG. 3 shows the configuration of the wavelength conversion device according to a first embodiment of the invention.

The configuration, and the functions of various portions, of a wavelength conversion device 30 which is a first embodiment of this invention are explained, referring to FIG. 3. The wavelength conversion device 30 of this invention is characterized in that a dispersion-reducing fiber 32 is used as the SC light generation portion, that is, as the SC medium. Other than the SC light generation portion, the configuration of the wavelength conversion device 30 is the same as that of the wavelength conversion device 10 shown in FIG. 1. That is, the incident light pulse train 40 is incident on the wavelength conversion device 30 from the input terminal 36, and is converted into SC light 33 in the dispersion-reducing fiber 32 which corresponds to the SC light generation portion. The SC light 33 is filtered by the optical wavelength filter 34, to become a light pulse train 35 with converted wavelength, which is output to the exterior via the output terminal 38 as the light pulse train 42 with converted wavelength.

The incident light pulse train 40 and emission pulse train 42 are drawn in explanatory fashion on the left and right sides respectively of FIG. 3. The incident light pulse train 40 and emission light pulse train 42 have the same shape on the time axis, but the wavelength is converted from $\lambda_S$ to $\lambda_1$. Of course, $\lambda_L < \lambda_1 < \lambda_H$.

A dispersion-reducing fiber is an optical fiber having characteristics such that the wavelength dispersion for light of a certain specific wavelength decreases with propagation in the guiding direction in the optical fiber. It is known that when a light pulse (more rigorously, an optical soliton pulse) is made to propagate in a dispersion-reducing fiber, the phenomenon of soliton adiabatic compression, called the soliton pulse compression effect, occurs, so that the full width at half-maximum of the propagating light pulse is reduced. Consequently the peak power of the incident light pulse 40 is increased, and as a result SC light 33 is generated with high efficiency.

Figure 4A:
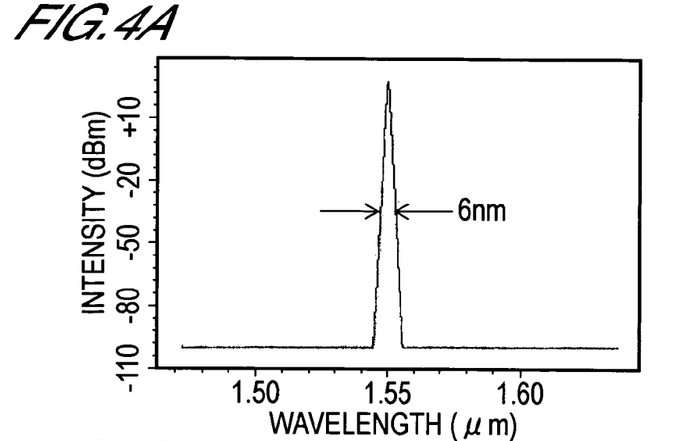
FIGS. 4A to 4C show the results of simulation of a wavelength conversion device using SC light.
Figure 4B:
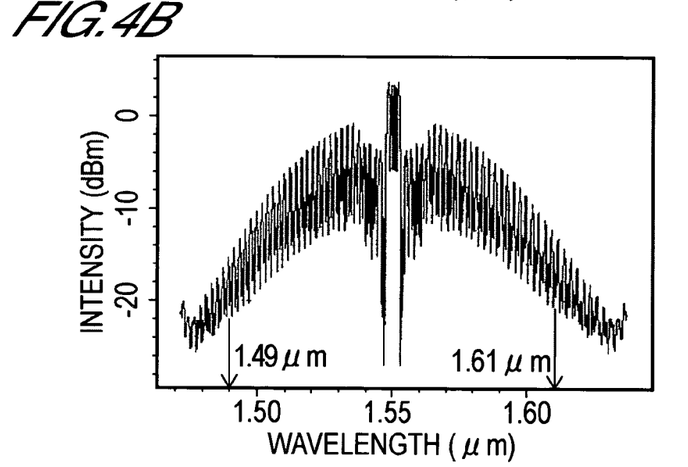
Figure 4C:
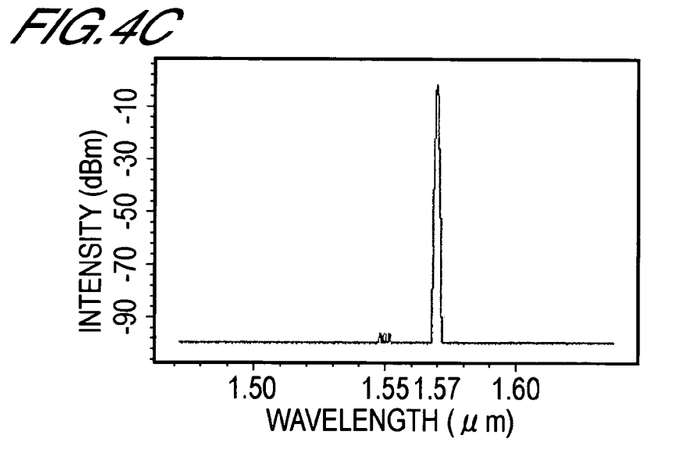

The manner in which incident light pulses of wavelength $\lambda_S=1.55$ µm are converted into SC light and filtered by an optical wavelength filter to obtain wavelength-converted light pulses is explained, referring to FIGS. 4A through 4C. The results indicated here are results obtained by numerical simulation, assuming the conditions described below. In the respective drawings, the horizontal axes indicate wavelengths in µm units, and the vertical axes indicate optical intensities in dBm units.

The incident light pulse was assumed to have a central wavelength of 1.55 µm, with a peak power of 5 W, a full width at half-maximum of 4 ps, and a Gaussian function shape with a repetition frequency $f_0$ of 10 GHz. Also, numerical analyses were performed for an optical wavelength filter which is a Gaussian-type optical wavelength filter with a transmission bandwidth (full width at half-maximum of the transmissivity curve) of 1 nm, and the central wavelength $\lambda_1$ of the transmission band of which is 1.57 µm. The length, wavelength dispersion, wavelength dispersion slope, and other parameters of the dispersion-reducing fiber used for generation of SC light appear together in Table 1. The input-end dispersion shown in Table 1 is the wavelength dispersion at the input end of the dispersion-reducing fiber; the output-end dispersion is the wavelength dispersion at the output end of the dispersion-reducing fiber. The wavelength dispersion declines linearly in moving from the input end toward the output end.

TABLE 1

| Parameter | Value | Unit |
|---|---|---|
| Fiber Length | 500 | m |
| Input-End Dispersion | +9 | ps/km/nm |
| Output-End Dispersion | −1 | ps/km/nm |
| Dispersion Slope | 0.11 | ps/km/nm$^2$ |
| Nonlinear Refractive Index | 2.6 × 10$^{-20}$ | m$^2$/W |
| Effective Cross Section | 50 | µm$^2$ |
| Loss | 0.2 | dB/km |

Numerical calculations for numerical simulations were performed by using the split-step Fourier method to solve the nonlinear Schrödinger equation. The method of using the split-step Fourier method to solve the nonlinear Schrödinger equation is already well-known, and the details are described for example in *Nonlinear Fiber Optics* by G. P. Agrawal. The nonlinear calculations themselves were performed using a simulator (by Optiwave, product name OptiSystem 2.1) created according to the above-described calculation method.

FIG. 4A shows the spectral shape of the incident light pulse 40. The full width at half-maximum is substantially 6 nm, and the central wavelength is 1.55 µm. When this incident light pulse 40 passes through the dispersion-reducing fiber 32, the SC light shown in FIG. 4B results. The band over which the SC light is distributed with an SC light optical intensity of −20 dBm or above is substantially 120 nm wide, from 1.49 µm to 1.61 µm. The full width at half-maximum of the spectrum of the above-described incident light pulse 40 was 6 nm, so that the bandwidth over which the SC light is distributed is broadened by approximately 20-fold.

It is clear from the fact that the band over which the optical intensity of the above-described SC light is −2 dBm or higher extends from the short-wavelength side wavelength ($\lambda_L$) of 1.49 µm to the long-wavelength side wavelength ($\lambda_H$) of 1.61 µm, and that the wavelength 1.57 µm is contained in this region, that a light pulse of wavelength 1.57 µm can be extracted by an optical wavelength filter from the SC light shown in FIG. 4B. From the above explanation, by filtering the SC light using a Gaussian optical wavelength filter the transmission band of which has a central wavelength $\lambda_1$ of 1.57 µm, it is seen that a converted output light pulse with a central wavelength $\lambda_S$ of 1.57 µm is obtained.

Below, conditions for performing the above-described wavelength conversion are explained in greater detail.

An excitation light pulse of central wavelength $\lambda_S$ is wavelength-converted into a light pulse having a wavelength spectrum band in the range from the wavelength $\lambda_L$ to the wavelength $\lambda_H$ (where $\lambda_L<\lambda_H$), as indicated by the following condition equation (1).

$$\lambda_L<\lambda_S<\lambda_H \qquad (1)$$

Further, as is clear from the above explanation, the central wavelength $\lambda_1$ of the transmission band of the optical wavelength filter which filters the SC light should be equivalent to the central wavelength $\lambda_S$ of the light pulse obtained through wavelength conversion, so that it is of course necessary that $$\lambda_L<\lambda_1<\lambda_H \qquad (2)$$

In other words, by using a wavelength filter the filtering transmission central wavelength $\lambda_1$ of which is in the range satisfied by condition equation (2), a light pulse of arbitrary wavelength can be selected and obtained from wavelengths in a broad range, from the wavelength $\lambda_L$ to the wavelength $\lambda_H$, from the SC light existing over the wavelength range from the wavelength $\lambda_L$ to the wavelength $\lambda_H$.

Next, conditions regarding the shape of the transmission band of the optical wavelength filter which filters the SC light are explained. If the transmission characteristic of the optical wavelength filter 34 is expressed as a function g(f) of the frequency f of the light, then when SC light is filtered by this optical wavelength filter 34, the spectral shape of the light output from the optical wavelength filter 34 should be the same as that of the transmission characteristic g(f) of the optical wavelength filter 34.

On the other hand, the temporal waveform G(t) of the light output from the optical wavelength filter 34 as a function of time t, and the spectral shape g(f) of the light output from the optical wavelength filter 34, are mutually related through a Fourier transform. Hence it is preferable that the shape of the transmission characteristic g(f) of the optical wavelength filter 34 be related through a Fourier transform of the temporal waveform G(t) as a function of time t of the light output from the optical wavelength filter 34.

A Gaussian function, after a Fourier transform, is again a Gaussian function. On the other hand, the shape of light pulses used in optical communication and similar can be well approximated by a Gaussian function, along either the time axis or the optical frequency axis. Hereafter, when a light pulse shape is expressed as a function of either the wavelength or of the frequency, this shall be called the spectrum of the light pulse, and when expressed as a function of time t, this shall be called a temporal waveform of the light pulse.

Figure 5A:
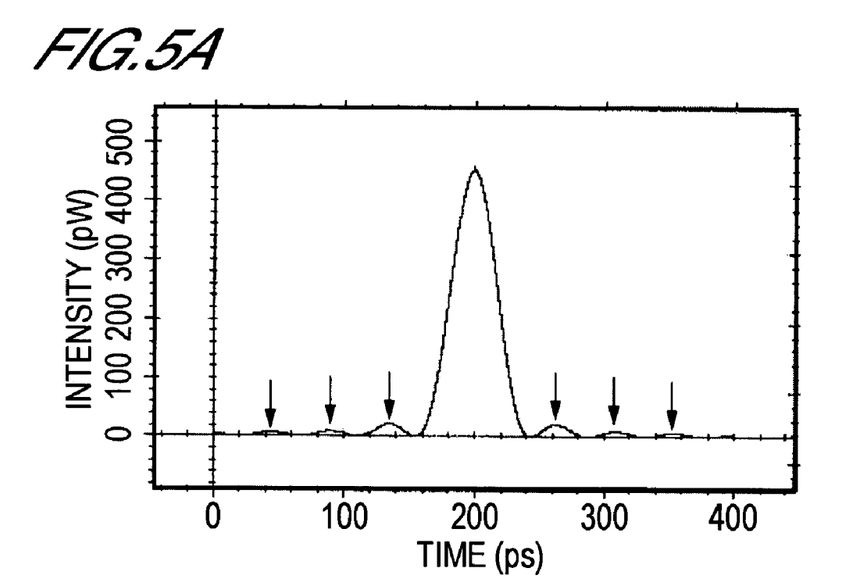
FIG. 5A shows the temporal waveform of a light pulse obtained by filtering using an optical wavelength filter such that the function g(f) expressing the transmission characteristic is a square-wave function.
Figure 5B:
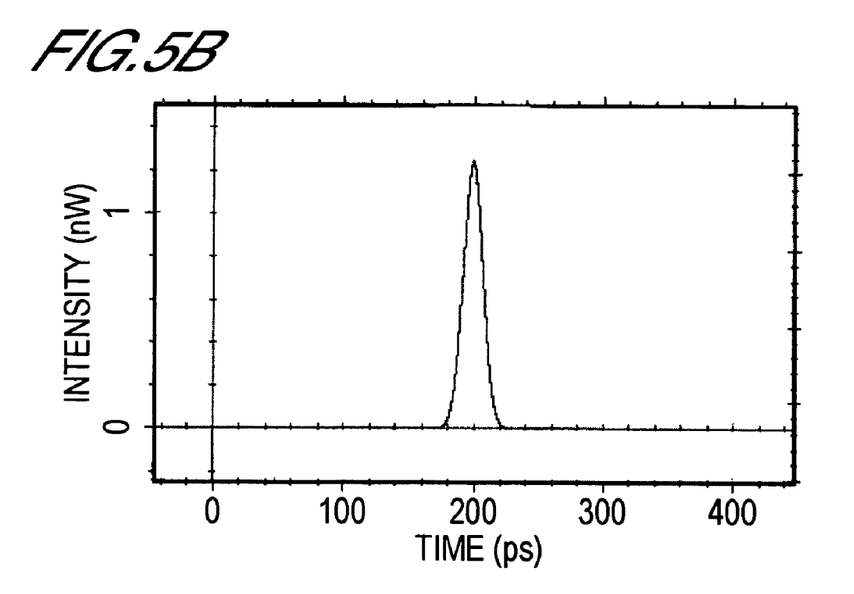
FIG. 5B shows the temporal waveform of a light pulse obtained by filtering using an optical wavelength filter such that the function g(f) expressing the transmission characteristic is a Gaussian function.

The fact that it is preferable that the shape of the transmission characteristic g(f) of the optical wavelength filter 34 be obtained by a Fourier transform of the temporal waveform G(t) of light output from the optical wavelength filter 34 as a function of time t is explained, referring to FIGS. 5A and 5B.

The vertical axes in both FIGS. 5A and 5B indicate the light intensity in watt units (in pW units in the graph of FIG. 5A, and in nW units in the graph of FIG. 5B), and the horizontal axes indicate the time in ps units. Both graphs are the results of calculated simulations.

FIG. 5A is a temporal waveform of light pulses obtained by filtering light pulses the temporal waveform G(t) of which is a Gaussian function shape, using an optical wavelength filter the transmission characteristic of which is given by the function g(f), which is a square-wave function. FIG. 5B is the temporal waveform of light pulses similarly obtained, when both the function g(f) giving the transmission characteristic of the optical wavelength filter and the function G(t) giving the temporal waveform of the light pulse have Gaussian function shapes.

In the temporal waveform of light pulses (shown in FIG. 5A) obtained by filtering light pulses the temporal waveform G(t) of which has a Gaussian function shape, using the optical wavelength filter the transmission characteristic of which is given by the function g(f), which is a square-wave function, side lobes, indicated by downward-pointing arrows, appear on both sides of the peak wavelength. These side lobes may possibly cause interference with adjacent light pulses, and so impede communication.

On the other hand, when both the function g(f) giving the transmission characteristic of the optical wavelength filter and the function G(t) giving the temporal waveform of the light pulses have a Gaussian function shape, as shown in FIG. 5B, the above-described side lobes do not appear in the temporal waveforms of light pulses obtained similarly to the case of FIG. 5A.

Hence it can be concluded that it is desirable that the shape of the transmission characteristic g(f) of the optical wavelength filter 34 be obtained by Fourier transform of the temporal waveform G(t) of the light output from the optical wavelength filter 34, as a function of time t.

Next, the conditions for interference with adjacent light pulses not to occur when light pulses form a train on the time axis and propagate in an optical transmission path are studied. In order for interference with adjacent light pulses not to occur, single light pulses must fit within a range on the time axis with a time width given by the minimum value of a bit slot ($1/f_0$) (seconds). Here, $f_0$ (Hz) is the frequency (bit rate) giving the frequency of appearance of light pulses on the time axis.

From this, if the full width at half-maximum of the temporal waveform of emission light pulses is $t_h$ (seconds), then the following condition must be satisfied.

$$t_h < 1/f_0 \quad (4)$$

Further, if the full width at half-maximum of the light pulse spectrum is $f_h$ (Hz), then if the light pulse spectrum and temporal waveform are Fourier-transform-limited Gaussian functions, then the relation $$t_h \times f_h \approx 0.44 \quad (5)$$

obtains between $t_h$ (seconds) and $f_h$ (Hz).

Further, the full width at half-maximum $f_h$ (Hz) of the light pulse spectrum coincides with the transmission bandwidth (the full width at half-maximum of the transmissivity curve) of the optical wavelength filter Δf (Hz). Hence from equations (4) and (5), the transmission bandwidth Δf (Hz) of the optical wavelength filter must satisfy the above-described relation $$\Delta f = f_h > 0.44 f_0 \quad (3)$$

Here the relation between the light pulse spectral width and light pulse temporal waveform when the above-described light pulse spectrum and temporal waveform are Fourier-transform-limited Gaussian functions is examined in detail.

Suppose that the temporal waveform of the light pulse is expressed by the Gaussian function U(t) given by the following equation (6) as a function of the time t (seconds).

$$U(t) = \exp(-t^2/2t_0^2) \quad (6)$$

Here $t_0$ (seconds) is the half-maximum width of the function U(t). The half-maximum width of the function U(t) is the time width between $t_1$ and $t_2$, when the times which result in 1/e of the maximum value of the optical intensity U(t) are $t_1$ and $t_2$. When the times which yield ½ of the maximum value of the optical intensity U(t) are $t_1'$ and $t_2'$, then the time width from $t_1'$ to $t_2'$ is called the full width at half-maximum, and is denoted by $t_h$ (seconds).

In the temporal waveform of a Gaussian-function light pulse, the relation given by the following equation (7) obtains between $t_0$ (seconds) and $t_h$ (seconds).

$$t_h = 2(\ln 2)^{1/2} t_0 \quad (7)$$

Here ln 2 is the natural logarithm of 2.

On the other hand, through a Fourier transform of U(t), the temporal waveform of the light pulse, the function u(ω) describing the shape of the spectrum of a Gaussian-function light pulse is given by the following equation (8).

$$u(\omega) = (2\pi t_0^2)^{1/2} \exp(-\omega^2 t_0^2/2) \quad (8)$$

Here ω (rad/s) is the angular frequency of the light pulse, and is related to the frequency f (Hz) by $$f = \omega/2\pi \quad (9)$$

Further, the half-maximum width $\omega_0$ (rad/s) of the light pulse spectrum u(ω) and the half-maximum width $t_0$ (seconds) of the light pulse temporal waveform U(t) are related by $$\omega_0 = 1/t_0 \quad (10)$$

The half-maximum width $\omega_0$ (rad/s) of the light pulse spectrum u(ω) refers to the angular frequency interval from $\omega_1$ to $\omega_2$ when the angular frequencies resulting in 1/e of the maximum value of the light pulse spectrum u(ω) are $\omega_1$ and $\omega_2$, provided that $\omega_1 < \omega_2$.

Also, the angular frequency interval from $\omega_1'$ to $\omega_2'$ when the angular frequencies resulting in ½ of the maximum value of the light pulse spectrum u(ω) are $\omega_1'$ and $\omega_2'$ is called the full width at half-maximum of the light pulse spectrum u(ω); denoted by $\omega_h$ (rad/s), it is related to $\omega_0$ (rad/s) by $$\omega_h = 2(\ln 2)^{1/2} \omega_0 \quad (11)$$

Here $\omega_1' < \omega_2'$.

From the above-described equations (7), (9), (10) and (11), the full width at half-maximum of the light pulse spectrum $f_h$ (Hz) and the full width at half-maximum $\omega_h$ (rad/s) of the light pulse spectrum u(ω) are related by $f_h = \omega_h/2\pi$, so that the relation between the full width at half-maximum $t_h$ (seconds) of the optical intensity U(t) and the full width at half-maximum $f_h$ (Hz) of the light pulse spectrum is given by the following equation (12).

$$t_h \times f_h = t_h \times (\omega_h/2\pi) = 2(\ln 2)/\pi \approx 0.44 \quad (12)$$

From the above explanation, the above-described relation $$t_h \times f_h \approx 0.44 \quad (5)$$

is obtained, and from this relation (5), as explained above, the transmission bandwidth $\Delta f$ (Hz) of the optical wavelength filter is given by the following equation:

$$\Delta f = f_h \approx 0.44/t_h > 0.44 f_0$$

$$\therefore \Delta f = f_h > 0.44 f_0 \quad (3)$$

Second Embodiment

Figure 6:
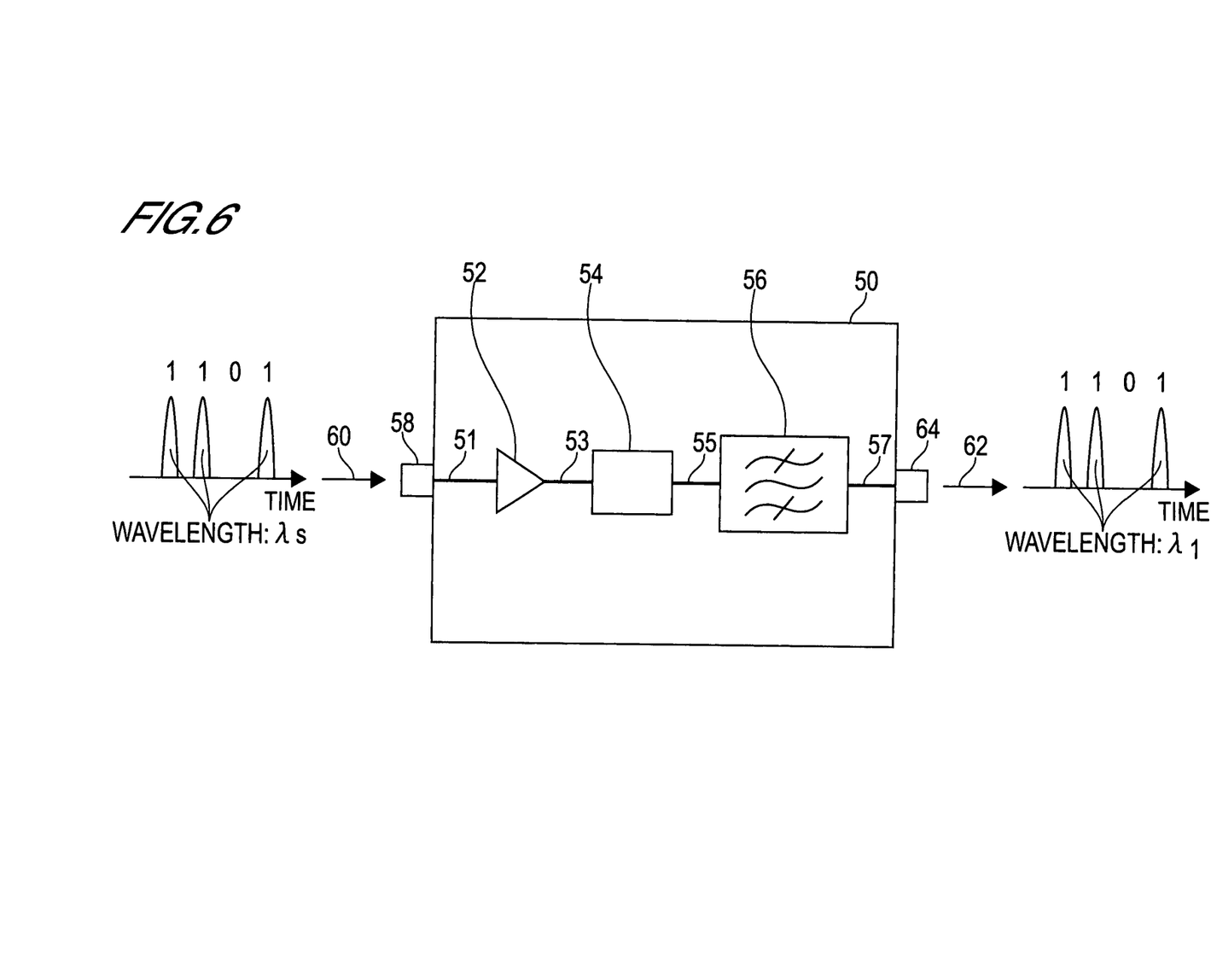
FIG. 6 shows the configuration of a wavelength conversion device according to a second embodiment of this invention.

A second embodiment of a wavelength conversion device of this invention is explained, referring to FIG. 6. A feature of the wavelength conversion device 50 of the second embodiment is the addition, to the basic configuration of a wavelength conversion device of this invention as already explained referring to FIG. 1, of an optical amplifier as a new constituent component. The wavelength conversion device 50 of the second embodiment is configured comprising an optical amplifier 52, SC light generation portion 54, and optical wavelength filter 56. An incident light pulse train 60 and emission light pulse train 62 are drawn in explanatory fashion on the left and right sides respectively of FIG. 6. The incident light pulse train 60 and emission light pulse train 62 have the same shape on the time axis, but the wavelength is converted from $\lambda_S$ to $\lambda_1$.

The light pulse train 60 drawn in explanatory fashion on the left side of FIG. 6 is an excitation light pulse train with wavelength $\lambda_S$, and, as the light pulse train to be converted, is incident on a wavelength conversion device 50 of this invention.

Below, an incident light pulse train for wavelength conversion may be called an excitation light pulse train, and an emission light pulse train which has been wavelength-converted may be called a converted light pulse train. Also, each of the individual light pulses comprised by a light pulse train may be called, in the case of an incident light pulse for wavelength conversion, an excitation light pulse, and in the case of an emission light pulse which has been wavelength-converted, a converted light pulse.

The configuration and the functions of various portions of the wavelength conversion device 50 which is the second embodiment of this invention are explained. The wavelength conversion device 50 features a configuration in which, by means of an optical amplifier 52, the peak power of a light pulse for conversion can be amplified to an optical intensity level sufficient for SC generation, prior to incidence of the light pulse for conversion on the SC light generation portion 54.

That is, the wavelength conversion device 50 which is the second embodiment of this invention comprises an optical amplifier which amplifies the peak power of an excitation light pulse in the incident optical path of the SC light generation portion of the excitation light pulse to an optical intensity level required for generation of SC light.

The configuration of the wavelength conversion device 50 is, except for the optical amplifier 52, the same as that of the wavelength conversion device 10 shown in FIG. 1. In other words, the incident light pulse train 60 is incident from the input terminal 58 on the wavelength conversion device 50, and by means of the optical amplifier 52, the peak power of the incident light pulse train 51 is amplified to a level equal to or greater than the optical intensity which is the lower limit necessary for SC light generation. An incident light pulse train 51 which has been amplified by the optical amplifier 52 becomes the light pulse train 53, and is converted into SC light 55 by the SC light generation portion 54. The SC light 55 is filtered by the optical wavelength filter 56, to become a light pulse train 57 with wavelength converted, which is output to the exterior via the output terminal 64 as a light pulse train 62 with wavelength converted.

Figure 7:
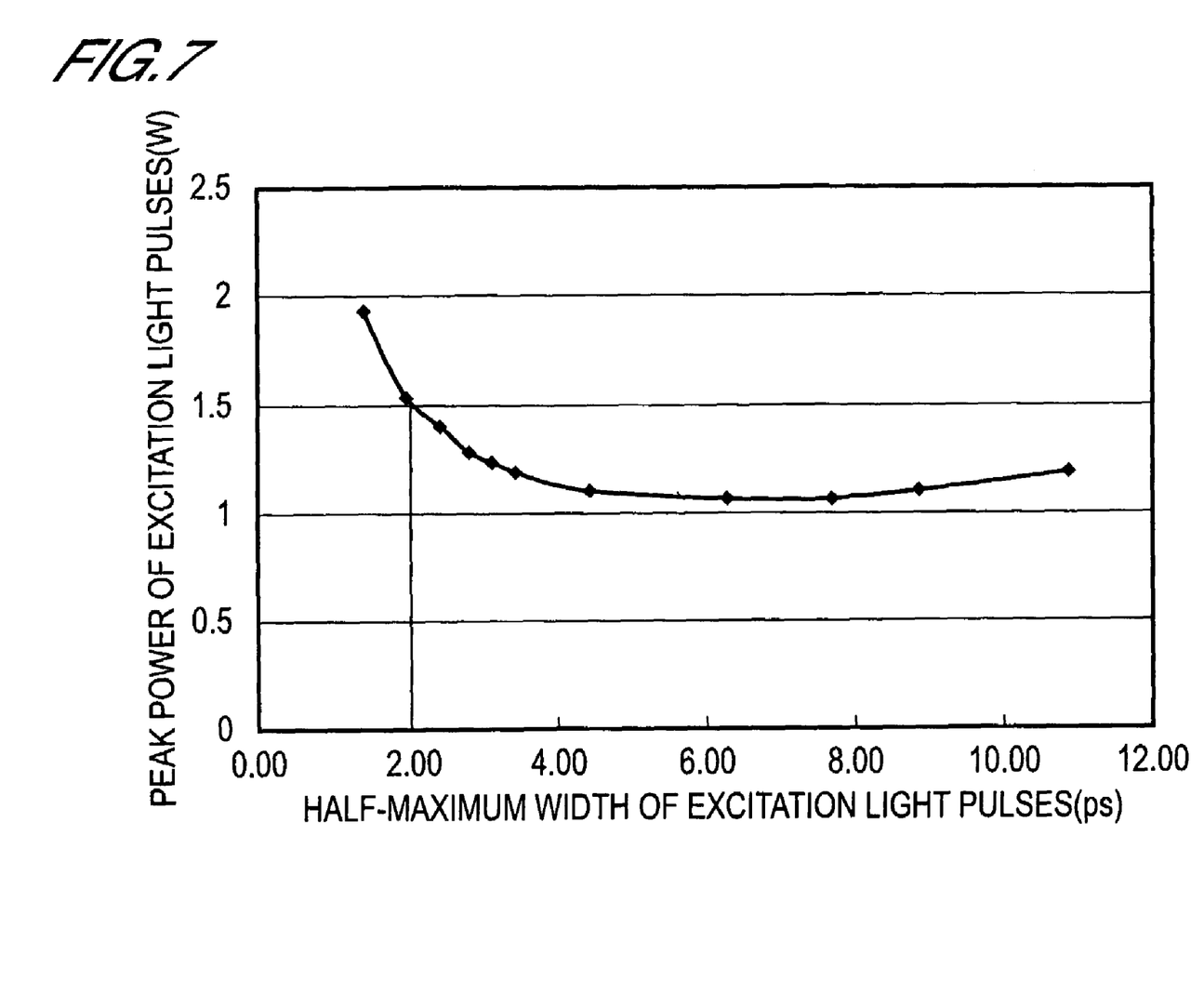
FIG. 7 shows the relation between the minimum peak power of an incident light pulse necessary for SC light generation, and the half-maximum width of the incident light pulse.

The peak power of the excitation light pulse deemed necessary to generate SC light from an excitation light pulse differs depending on the incident light pulse width and on the physical characteristics of the constituent members of the SC light generation portion. As one example, the relation between the incident light pulse width and the peak power of an incident light pulse necessary for generation of SC light, employing a dispersion-reducing optical fiber having the various characteristics described in Table 1 as a constituent member of the SC light generation portion, was simulated. The result is shown in FIG. 7. The length of the dispersion-reducing optical fiber was assumed to be 1000 m, and a simulator created according to a calculation method involving solution of the above-described nonlinear Schrödinger equation by the split-step Fourier method (by Optiwave, product name OptiSystem 2.1) was used.

FIG. 7 shows the relation between the half-maximum width of excitation light pulses and the minimum peak power of excitation light pulses required for SC light generation, as obtained from the above simulations. The vertical axis indicates the peak power of excitation light pulses in watt units; the horizontal axis indicates the half-maximum width of excitation light pulses in ps units. In FIG. 7, values indicated by black dots denote simulation results; these values are smoothly connected by the solid line to indicate the minimum peak power values of excitation light pulses necessary for SC light generation. Hence if the peak power of an excitation light pulse is equal to or greater than the value indicated by the solid line, SC light is generated. For example, if the half-maximum width of the excitation light pulse is 2 ps, then if the peak power of the excitation light pulse is 1.5 W or greater, SC light is generated.

By means of the wavelength conversion device 50 comprising an optical amplifier 52, even if the peak power of an incident light pulse which is incident on the wavelength conversion device 50 is equal to or less than the value required for SC light generation, the desired wavelength conversion can be performed. That is, if the incident light pulse is amplified by the optical amplifier 52, the amplification of the optical amplifier 52 can be set such that the peak power of an incident light pulse is equal to or greater than the minimum peak power of an excitation light pulse required for SC light generation as described above, so that the desired wavelength conversion can be performed.

Third Embodiment

Figure 8:
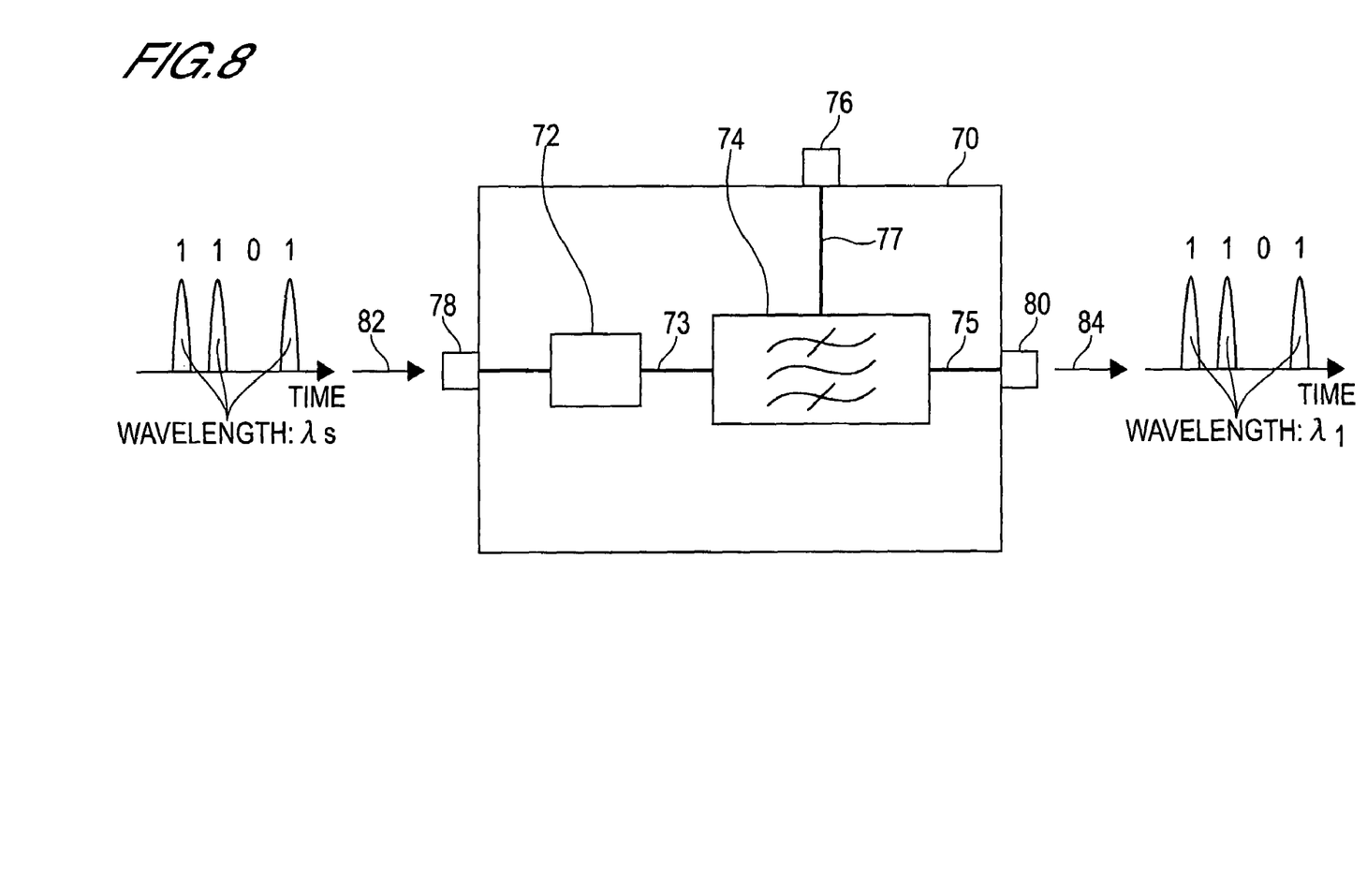
FIG. 8 shows the configuration of a wavelength conversion device according to a third embodiment of this invention.

A third embodiment of a wavelength conversion device of this invention is explained, referring to FIG. 8. A feature of the wavelength conversion device 70 of the third embodiment is that the optical wavelength filter 74, equivalent to the optical wavelength filter 14 in the basic configuration of FIG. 1, comprises a transmission wavelength-variable filter the central wavelength of transmitted light of which is variable. The wavelength conversion device 70 is configured comprising an SC light generation portion 72 and a transmission wavelength-variable filter 74. The incident light pulse train 82 and emission light pulse train 84 are drawn in explanatory fashion on the left and right sides respectively of FIG. 8. The incident light pulse train 82 and the emission light pulse train 84 have the same shape on the time axis, but the wavelength is converted from $\lambda_S$ to $\lambda_1$.

The configuration and the functions of various portions of the wavelength conversion device 70 which is the third embodiment of this invention are explained. Other than the fact that the optical wavelength filter 74 comprises a transmission wavelength-variable filter the transmission light central wavelength of which is variable, the wavelength conversion device 70 is the same as the wavelength conversion device 10 which has the basic configuration of a wavelength conversion device of this invention, shown in FIG. 1. That is, an incident light pulse train 82 is incident from the input terminal 78 on the wavelength conversion device 70, and in the SC light generation portion 72 is converted into SC light 73. The SC light 73 is filtered by the transmission wavelength-variable filter 74, becoming a light pulse train 75 with converted wavelength, and is output to the exterior via the output terminal 80 as a light pulse train 84 with wavelength converted.

By means of the wavelength conversion device 70 comprising a transmission wavelength-variable filter 74, an incident light pulse can be wavelength-converted to an arbitrary wavelength.

The central wavelength $\lambda_1$ of the transmission band of the transmission wavelength-variable filter 74 can be varied arbitrarily within the range from wavelength $\lambda_L$ to wavelength $\lambda_H$ (where $\lambda_L<\lambda_H$) which is the spectral band of the SC light by means of a control signal 77 supplied from the optical wavelength filter control signal input terminal 76, so that the wavelength of the emission light pulse can be selected. That is, if the central wavelength $\lambda_1$ of the transmission band of the transmission wavelength-variable filter 74 is selected such that $\lambda_L<\lambda_1<\lambda_H$, then an input light pulse of wavelength $\lambda_S$ results in an output light pulse of wavelength $\lambda_1$. However, a condition is that the wavelength $\lambda_L$, the wavelength $\lambda_H$, the wavelength $\lambda_S$, and the wavelength $\lambda_1$ must satisfy the following conditions (1) and (2):

$$\lambda_L<\lambda_S<\lambda_H \quad (1)$$

$$\lambda_L<\lambda_1<\lambda_H \quad (2)$$

As the transmission wavelength-variable filter, a Fabry-Perot type optical wavelength filter, of the type enabling adjustment of the length of the oscillator using a piezoelectric element, can be used. In this case, the control signal 77 supplied from the optical wavelength filter control signal input terminal 76 is a voltage signal. Of course a Fabry-Perot type optical wavelength filter of the type in which the oscillator is adjusted mechanically to change the central wavelength of transmitted light can also be used as the transmission wavelength-variable filter. And as optical wavelength filters which can be utilized as the above-described transmission wavelength-variable filter, for example, the WTFA series manufactured by Optoquest Co., Ltd. are commercially marketed.

Fourth Embodiment

Figure 9:
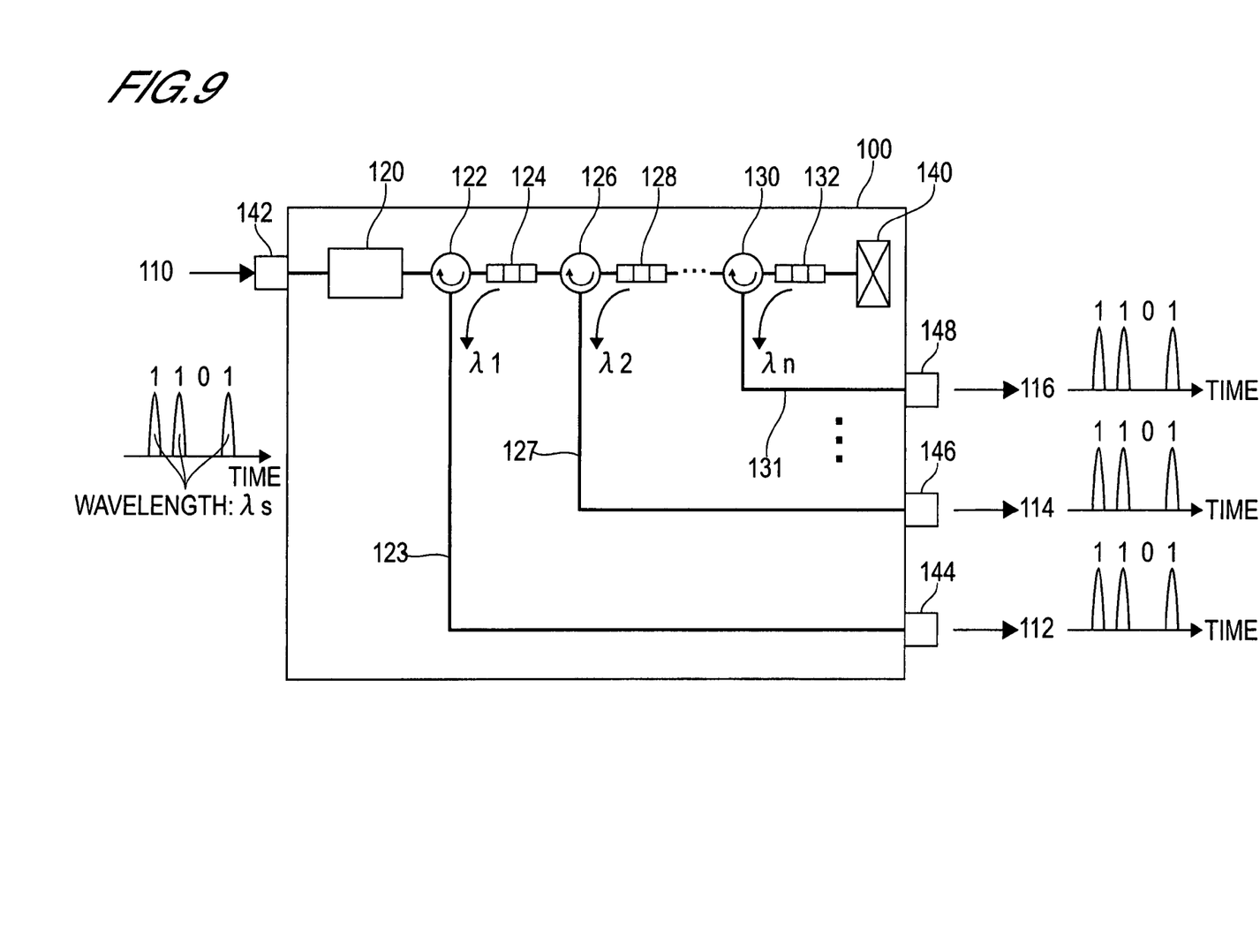
FIG. 9 shows the configuration of a wavelength conversion device according to a fourth embodiment of this invention; and, FIG. 10 shows the configuration of a wavelength conversion device according to a fifth embodiment of this invention.

A fourth embodiment of a wavelength conversion device of this invention is explained, referring to FIG. 9. A feature of the wavelength conversion device 100 of the fourth embodiment is a configuration which, in place of the optical wavelength filter 14 in the basic configuration of FIG. 1, comprises optical circulators and optical wavelength filters arranged serially and alternately, and the optical wavelength filter of which employs an optical fiber grating.

SC light resulting from wavelength-conversion of an incident light pulse of wavelength $\lambda_S$, emitted from the SC light generation portion 120, passes through the first optical circulator 122 and is incident on the first optical fiber grating 124. The first optical fiber grating 124 has the function of an optical wavelength filter which reflects only the light pulse of wavelength $\lambda_1$, and transmits light pulses of other wavelengths. Hence only a light pulse of wavelength $\lambda_1$ is reflected by the first optical fiber grating 124, and is incident again on the first optical circulator 122, arriving at the first output terminal 144 as a light pulse 123 of wavelength $\lambda_1$, and being output to the exterior as the light pulse 112 of wavelength $\lambda_1$. That is, an incident light pulse of wavelength $\lambda_S$ is wavelength-converted and output from the first output terminal 144 as a light pulse 112 of wavelength $\lambda_1$, to perform a first wavelength conversion.

SC light resulting from wavelength conversion of an incident light pulse of wavelength $\lambda_S$ and emitted from the SC light generation portion 120 passes through the first optical circulator 122 and first fiber grating 124, and further passes through the second optical circulator 126 and is incident on the second optical fiber grating 128. The second optical fiber grating 128 has the function of an optical wavelength filter which reflects only a light pulse of wavelength $\lambda_2$, and transmits light pulses of other wavelengths.

Hence only a light pulse of wavelength $\lambda_2$ is reflected by the second optical fiber grating 128, is incident again on the second optical circulator 126, reaches the second output terminal 146 as a light pulse of wavelength $\lambda_2$, and is output to the exterior as a light pulse 114 of wavelength $\lambda_2$. That is, an incident light pulse of wavelength $\lambda_S$ is wavelength-converted and output from the second output terminal 146 as a light pulse 114 of wavelength $\lambda_2$, to perform a second wavelength conversion.

Similarly in stages beyond the second optical fiber grating 128, optical circulators and optical fiber gratings are combined as described above, arranged serially in alternation, so that an incident light pulse of wavelength $\lambda_S$ emitted from the SC light generation portion 120 can be wavelength-converted into n light pulses each with different wavelengths $\lambda_3, \lambda_4, \ldots, \lambda_n$ (where n is an integer equal to or greater than 2).

The incident light pulse of wavelength $\lambda_S$ is wavelength-converted and output from the nth output terminal 148, from the combination of the nth optical circulator 130 and the nth optical fiber grating 132, which is the final stage, as a light pulse 116 of wavelength $\lambda_n$. That is, an incident light pulse of wavelength $\lambda_S$ is wavelength-converted and output from the nth output terminal 148 as a light pulse 116 of wavelength $\lambda_n$, to perform the nth wavelength conversion.

An optical terminator 140 is connected in the stage following the nth optical fiber grating, and a light pulse reaching this optical terminator (a light pulse the wavelength of which is other than the above $\lambda_1, \lambda_2, \lambda_3, \ldots, \lambda_n$) is handled so as not to return again to the SC light generation portion 120.

Of course, the wavelength $\lambda_S$ of the incident light pulse, and the wavelengths $\lambda_1, \lambda_2, \lambda_3, \ldots, \lambda_n$ of emission light pulses obtained by wavelength conversion, must be within the range from the wavelength $\lambda_L$ to the wavelength $\lambda_H$ (where $\lambda_L<\lambda_H$) which is the spectral band of the SC light, and moreover must of course be different wavelengths. That is, $$\lambda_L < \lambda_S < \lambda_H \qquad (1)$$

$$\lambda_L < \lambda_1 < \lambda_H \qquad (2\text{-}1)$$

$$\lambda_L < \lambda_2 < \lambda_H \qquad (2\text{-}2)$$

.

.

.

$$\lambda_L < \lambda_n < \lambda_H \qquad (2\text{-}n)$$

Moreover, $\lambda_1, \lambda_2, \lambda_3, \ldots, \lambda_n$ are mutually different.

The incident light pulse train 110 and emission light pulse trains 112, 114, 116 are drawn in explanatory fashion on the left and right sides respectively of FIG. 9. The incident light pulse train 110 and the emission light pulse trains 112, 114, 116 have the same shape on the time axis, but the wavelength is converted from $\lambda_S$ to $\lambda_1, \lambda_2, \lambda_3, \ldots, \lambda_n$.

Of course, in place of the optical wavelength filter 14 in the basic configuration of FIG. 1, the portion in which optical circulators and optical wavelength filters are arranged serially and alternately may comprise a first optical circulator 122 and a first optical fiber grating 124, with the portions performing the second wavelength conversion, third wavelength conversion, and similarly to the nth wavelength conversion, provided in stages beyond the second optical circular, omitted. In this case, light pulses obtained from wavelength conversion by the wavelength conversion device are only light pulses with a central wavelength of $\lambda_1$.

Fifth Embodiment

Figure 10:
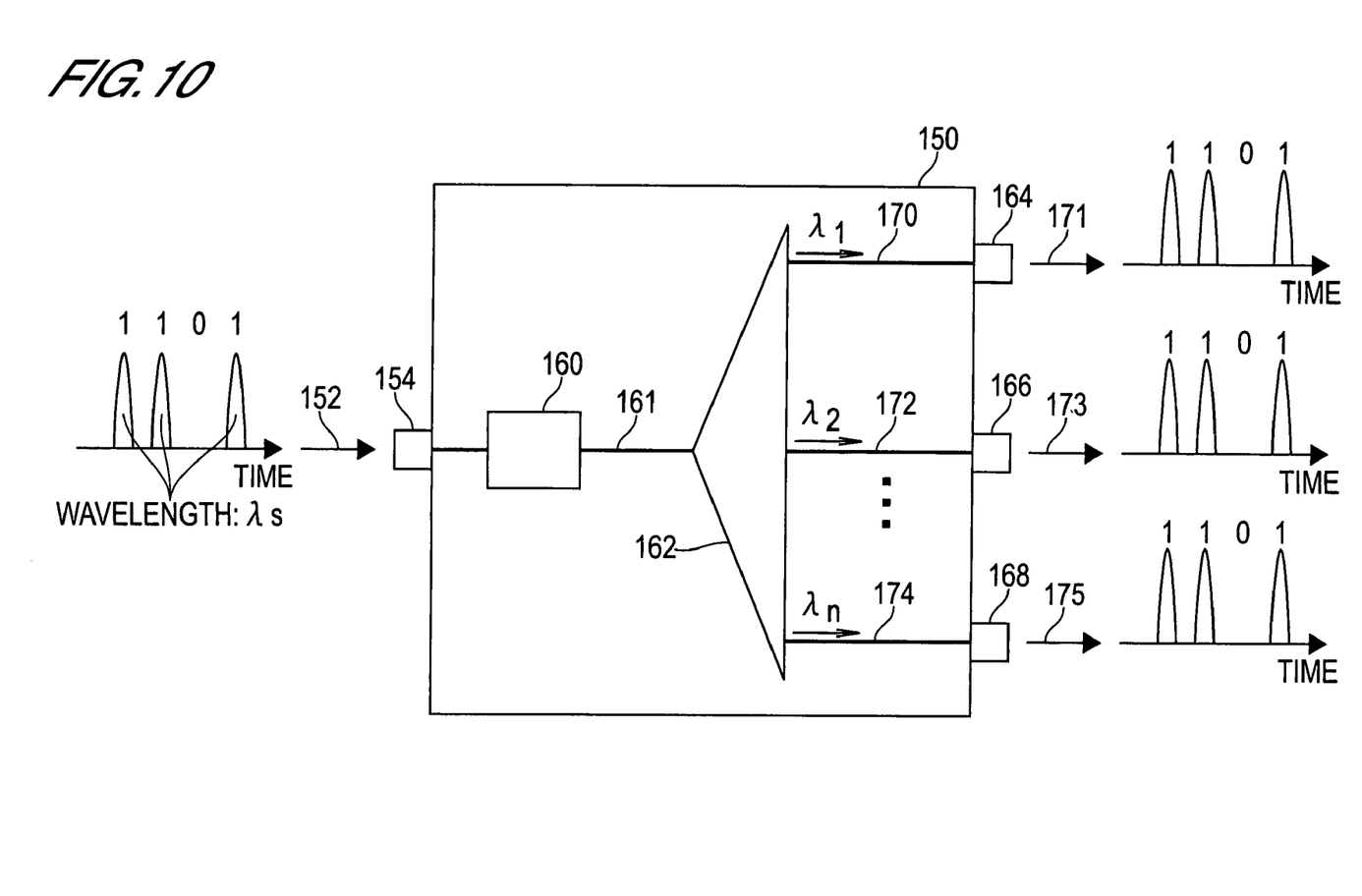

A fifth embodiment of a wavelength conversion device of this invention is explained, referring to FIG. 10. A feature of the wavelength conversion device 150 of the fifth embodiment is a configuration in which the optical wavelength filter equivalent to the optical wavelength filter of the basic configuration of FIG. 1 uses an arrayed waveguide grating (AWG) 162.

The AWG 162 is configured by collecting a plurality of optical waveguides having wavelength selectivity, and is an element which has a function to separate light pulses having different central wavelengths $\lambda_1, \lambda_2, \lambda_3, \ldots, \lambda_n$, and to output each to different output terminals.

An incident light pulse 152 is incident from the input terminal 154 on the wavelength conversion device 150, is incident on the SC light generation portion 160 and becomes SC light 161, and is incident on the AWG 162. Light pulses having different central wavelengths $\lambda_1, \lambda_2, \lambda_3, \ldots, \lambda_n$ (where n is an integer greater than or equal to 2) are separated, are extracted as a light pulse with a central wavelength of $\lambda_1$, a light pulse with a central wavelength of $\lambda_2, \ldots$, and a light pulse with a central wavelength of $\lambda_n$, and the n types of light pulses 171, 173, 175 are output to the exterior via the respective output terminals 164, 166, 168.

By means of a wavelength conversion device 150 with the above-described configuration, similarly to the wavelength conversion device 100 which is the above-described fourth embodiment, an incident light pulse of wavelength $\lambda_S$ is wavelength-converted, and a light pulse with central wavelength $\lambda_1$, a light pulse with central wavelength $\lambda_2, \ldots$, and a light pulse with central wavelength $\lambda_n$, each with different wavelengths, are obtained.

Of course, similarly to the wavelength conversion device of the above-described fourth embodiment, the wavelength $\lambda_S$ of the incident light pulse, and the wavelengths $\lambda_1, \lambda_2, \lambda_3, \ldots, \lambda_n$ of the emission light pulses obtained from wavelength conversion must be within the range from the wavelength $\lambda_L$ to the wavelength $\lambda_H$ (where $\lambda_L < \lambda_H$) which is within the spectral band of SC light, and of course must be different wavelengths. That is, $$\lambda_L < \lambda_S < \lambda_H \qquad (1)$$

$$\lambda_L < \lambda_1 < \lambda_H \qquad (2\text{-}1)$$

$$\lambda_L < \lambda_2 < \lambda_H \qquad (2\text{-}2)$$

.

.

.

$$\lambda_L < \lambda_n < \lambda_H \qquad (2\text{-}n)$$

and moreover, $\lambda_1, \lambda_2, \lambda_3, \ldots, \lambda_n$ are mutually different.

The incident light pulse train 152 and the emission light pulse trains 171, 173, 175 are drawn in explanatory fashion on the left and right sides respectively of FIG. 10. The incident light pulse train 152 and the emission light pulse trains 171, 173, 175 have the same shape on the time axis, but the wavelength is converted from $\lambda_S$ to $\lambda_1, \lambda_2, \lambda_3, \ldots, \lambda_n$.

Merits of the Invention

As explained above, by means of a wavelength conversion device of this invention, an excitation light pulse of central wavelength $\lambda_S$, that is, an incident light pulse is wavelength-converted to a light pulse which is SC light having a wavelength spectral band with wavelength in the range from wavelength $\lambda_L$ to wavelength $\lambda_H$ (where $\lambda_L < \lambda_H$). By using an optical wavelength filter the transmission central wavelength $\lambda_i$ of which is in the range satisfying $\lambda_L < \lambda_i < \lambda_H$ (where i is a natural number) to filter the SC light, a light pulse with central frequency in the broad range of wavelengths from wavelength $\lambda_L$ to wavelength $\lambda_H$ can be selected and extracted from the SC light existing over the range from wavelength $\lambda_L$ to wavelength $\lambda_H$. From this, by means of a wavelength conversion device of this invention, an incident light pulse the central wavelength of which is $\lambda_S$ can be converted into a light pulse the central wavelength of which is $\lambda_i$ (where i is a natural number).

What is claimed is:

1. A wavelength conversion device which converts an excitation light pulse with central wavelength $\lambda_S$ into light pulses with central wavelength $\lambda_1, \lambda_2, \lambda_3, \ldots, \lambda_n$ (where n is a natural number), comprising:

an SC (supercontinuum) light generation portion, onto which the excitation light pulse of central wavelength $\lambda_S$ is incident, and which generates SC light having a spectral shape distributed over the range from wavelength $\lambda_L$ to wavelength $\lambda_H$ (where $\lambda_L < \lambda_H$); and, an optical wavelength filter which filters the SC light, and the transmission central wavelengths of which are $\lambda_1, \lambda_2, \lambda_3, \ldots, \lambda_n$ (where n is a natural number); and wherein the following conditions (1) and (2-1), (2-2), . . ., (2-n) between the wavelength $\lambda_L$, the wavelength $\lambda_H$, the wavelength $\lambda_S$, and the wavelengths $\lambda_1, \lambda_2, \lambda_3, \ldots, \lambda_n$ (where n is a natural number) are satisfied $$\lambda_L < \lambda_S < \lambda_H \qquad (1)$$

$$\lambda_L < \lambda_1 < \lambda_H \qquad (2\text{-}1)$$

.
.
.

$\lambda_L < \lambda_n < \lambda_H$ (2-n).

2. The wavelength conversion device according to claim 1, wherein said SC light generation portion is an optical fiber having a characteristic such that the absolute value of the wavelength dispersion at the wavelength $\lambda_S$ decreases in the propagation direction.

3. The wavelength conversion device according to claim 1, wherein said optical wavelength filter has a transmission characteristic such that the shape of the transmitted light spectrum is equivalent to the spectral shape obtained by a Fourier transform of the temporal waveforms of light pulses the central wavelengths of which are $\lambda_1, \lambda_2, \lambda_3, \ldots, \lambda_n$ (where n is a natural number).

4. The wavelength conversion device according to claim 2, wherein said optical wavelength filter has a transmission characteristic such that the shape of the transmitted light spectrum is equivalent to the spectral shape obtained by a Fourier transform of the temporal waveforms of light pulses the central wavelengths of which are $\lambda_1, \lambda_2, \lambda_3, \ldots, \lambda_n$ (where n is a natural number).

5. The wavelength conversion device according to claim 3, wherein said optical wavelength filter has a transmission characteristic such that the light transmissivity is represented by a Gaussian function, with the wavelength as an independent variable.

6. The wavelength conversion device according to claim 4, wherein said optical wavelength filter has a transmission characteristic such that the light transmissivity is represented by a Gaussian function, with the wavelength as an independent variable.

7. The wavelength conversion device according to claim 3, wherein the transmission bandwidth $\Delta f$ (Hz) of said optical wavelength filter satisfies the following condition (3):

$$\Delta f = f_h > 0.44 f_0 \qquad (3)$$

where $f_h$ (Hz) is the full width at half-maximum on the time axis of converted light pulses of wavelengths $\lambda_1, \lambda_2, \lambda_3, \ldots, \lambda_n$ (where n is a natural number), and $f_0$ (Hz) is equivalent to the frequency (bit rate) giving the frequency of appearance of light pulses on the time axis.

8. The wavelength conversion device according to claim 4, wherein the transmission bandwidth $\Delta f$ (Hz) of said optical wavelength filter satisfies the following condition (3):

$$\Delta f = f_h > 0.44 f_0 \qquad (3)$$

where $f_h$ (Hz) is the full width at half-maximum on the time axis of converted light pulses of wavelengths $\lambda_1, \lambda_2, \lambda_3, \ldots, \lambda_n$ (where n is a natural number), and $f_0$ (Hz) is equivalent to the frequency (bit rate) giving the frequency of appearance of light pulses on the time axis.

9. The wavelength conversion device according to claim 5, wherein the transmission bandwidth $\Delta f$ (Hz) of said optical wavelength filter satisfies the following condition (3):

$$\Delta f = f_h > 0.44 f_0 \qquad (3)$$

where $f_h$ (Hz) is the full width at half-maximum on the time axis of converted light pulses of wavelengths $\lambda_1, \lambda_2, \lambda_3, \ldots, \lambda_n$ (where n is a natural number), and $f_0$ (Hz) is equivalent to the frequency (bit rate) giving the frequency of appearance of light pulses on the time axis.

10. The wavelength conversion device according to claim 6, wherein the transmission bandwidth $\Delta f$ (Hz) of said optical wavelength filter satisfies the following condition (3):

$$\Delta f = f_h > 0.44 f_0 \qquad (3)$$

where $f_h$ (Hz) is the full width at half-maximum on the time axis of converted light pulses of wavelengths $\lambda_1, \lambda_2, \lambda_3, \ldots, \lambda_n$ (where n is a natural number), and $f_0$ (Hz) is equivalent to the frequency (bit rate) giving the frequency of appearance of light pulses on the time axis.

11. The wavelength conversion device according to claim 1, comprising an optical amplifier in the incident optical path of said SC light generation portion of said excitation light pulse, the optical amplifier amplifying the peak power of the excitation light pulse to the optical intensity level necessary for generation of SC light.

12. The wavelength conversion device according to claim 1, wherein said optical wavelength filter is a transmission wavelength-variable filter, the transmission light central frequency of which can be varied.

13. The wavelength conversion device according to claim 1, wherein said optical wavelength filter is configured using an optical fiber grating, and by arranging serially an optical circulator and optical wavelength filter.

14. The wavelength conversion device according to claim 1, wherein said optical wavelength filter is configured using an optical fiber grating, and by arranging optical circulators and optical wavelength filters serially and alternately.

15. The wavelength conversion device according to claim 1, wherein said optical wavelength filter is an arrayed waveguide grating.

* * * * *